(12) United States Patent
Kato et al.

(10) Patent No.: US 12,492,732 B2
(45) Date of Patent: Dec. 9, 2025

(54) ATTACHMENT STRUCTURE OF BRAKE DISK FOR RAILWAY VEHICLE, AND BRAKE DISK UNIT USING SAME

(71) Applicant: NIPPON STEEL CORPORATION, Tokyo (JP)

(72) Inventors: Takanori Kato, Tokyo (JP); Atsushi Sakaguchi, Tokyo (JP); Naruo Miyabe, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 661 days.

(21) Appl. No.: 17/281,704

(22) PCT Filed: Oct. 1, 2019

(86) PCT No.: PCT/JP2019/038695
§ 371 (c)(1),
(2) Date: Mar. 31, 2021

(87) PCT Pub. No.: WO2020/071347
PCT Pub. Date: Apr. 9, 2020

(65) Prior Publication Data
US 2021/0396287 A1    Dec. 23, 2021

(30) Foreign Application Priority Data
Oct. 3, 2018    (JP) .................. 2018-188016

(51) Int. Cl.
*F16D 65/12*    (2006.01)
*F16B 43/00*    (2006.01)
*F16D 65/02*    (2006.01)

(52) U.S. Cl.
CPC ............ *F16D 65/124* (2013.01); *F16B 43/00* (2013.01); *F16D 65/12* (2013.01);
(Continued)

(58) Field of Classification Search
CPC ........... F16D 65/124; F16D 2065/1348; F16D 2065/1364; F16D 2065/1396;
(Continued)

(56) References Cited

U.S. PATENT DOCUMENTS 1,057,686 A * 4/1913 Thomson ............... F16B 39/24
411/155
1,183,174 A * 5/1916 Dice ..................... F16B 39/24
411/957
(Continued)

FOREIGN PATENT DOCUMENTS

JP    2001187911 A *  7/2001
JP    2002323029 A    11/2002
(Continued)

OTHER PUBLICATIONS

S. Shit et al., "A Review on Silicone Rubber" National Academy of Sciences, India, published Jul. 30, 2013; 11 pages.
(Continued)

*Primary Examiner* — Vishal R Sahni
(74) *Attorney, Agent, or Firm* — Greer, Burns & Crain, Ltd.

(57) ABSTRACT

An attachment structure is a structure that attaches an annular brake disk to an attachment object member that is a wheel or a disk body of a railway vehicle. The attachment structure includes a fastening member and an elastic member. The elastic member is disposed between a nut of the fastening member and the brake disk. The elastic member has a member body having a tubular shape, and a flange. The flange is connected to an end part on the nut side among two end parts of the member body. The flange protrudes outward from the member body and contacts an outer peripheral portion of the nut.

3 Claims, 9 Drawing Sheets

(52) U.S. Cl.
CPC .............. *F16D 2065/1308* (2013.01); *F16D 2065/1384* (2013.01); *F16D 2065/1388* (2013.01); *F16D 2065/1396* (2013.01)

(58) Field of Classification Search
CPC .............. F16D 65/123; F16D 65/128; F16D 2065/1392; F16D 65/12; F16D 2065/1308; F16D 2065/1384; F16D 2065/1388; F16B 39/24; F16B 43/00; F16B 39/26; F16F 1/32; F16F 1/34; B61H 5/00; B61H 11/14
USPC ........................................................ 267/161
See application file for complete search history.

(56) References Cited

U.S. PATENT DOCUMENTS

| | | | | |
|---|---|---|---|---|
| 1,504,511 A * | 8/1924 | Ross | ............... | F16B 39/24 411/958 |
| 1,567,649 A * | 12/1925 | Hultgren | ............... | F16B 43/00 411/147 |
| 1,648,347 A * | 11/1927 | Hosking | ............... | F16B 39/24 411/957 |
| 2,766,799 A * | 10/1956 | Poupitch | ............... | F16B 43/005 470/42 |
| 2,923,340 A * | 2/1960 | Williams | ............... | F16B 39/24 411/974 |
| 3,002,544 A * | 10/1961 | Buechting | ............... | F16B 39/24 411/157 |
| 3,134,585 A * | 5/1964 | Trask | ............... | F16F 1/40 267/141.1 |
| 3,202,412 A * | 8/1965 | Trask | ............... | F16F 13/08 267/141 |
| 3,279,779 A * | 10/1966 | Kloss | ............... | F16F 3/12 267/153 |
| 3,315,951 A * | 4/1967 | Boschi | ............... | F16F 1/422 267/141 |
| 3,416,783 A * | 12/1968 | Tondato | ............... | F16F 3/12 213/40 R |
| 3,426,819 A * | 2/1969 | Estes | ............... | F16B 43/00 411/360 |
| 3,489,402 A * | 1/1970 | Cobley | ............... | F16F 3/12 267/152 |
| 4,006,803 A * | 2/1977 | Klein | ............... | F16D 65/124 188/218 XL |
| 4,073,858 A * | 2/1978 | Chung | ............... | F16F 1/3605 267/152 |
| 4,102,443 A * | 7/1978 | Kohler | ............... | B61H 5/00 188/218 XL |
| 4,364,615 A * | 12/1982 | Euler | ............... | F16C 35/063 384/903 |
| 4,958,970 A * | 9/1990 | Rose | ............... | F16B 31/04 411/12 |
| 5,957,441 A * | 9/1999 | Tews | ............... | F16F 1/373 267/153 |
| 7,490,819 B2 * | 2/2009 | Molitor | ............... | B60G 11/22 267/153 |
| 2014/0248146 A1 | 9/2014 | Sander et al. | | |
| 2014/0284859 A1 * | 9/2014 | Nobusue | ............... | F16F 1/373 267/292 |
| 2019/0315156 A1 * | 10/2019 | Nakagawa | ............... | B60B 3/16 |

FOREIGN PATENT DOCUMENTS

| | | | |
|---|---|---|---|
| JP | 2007218413 A * | 8/2007 | |
| JP | 2008121774 A | 5/2008 | |
| JP | 4305296 B2 | 7/2009 | |
| JP | 2010060031 A | 3/2010 | |
| JP | 4748390 B2 | 8/2011 | |
| JP | 2014190344 A | 10/2014 | |

OTHER PUBLICATIONS

W. Zhong, et al., "The Crack Initiation Mechanism of Steel Disc When Paired with Fe-PM Pad for High-Speed Train Braking" ScienceDirect, Engineering Failure Analysis, 2024; 15 pages.

* cited by examiner

ATTACHMENT STRUCTURE OF BRAKE DISK FOR RAILWAY VEHICLE, AND BRAKE DISK UNIT USING SAME

This is a National Phase Application filed under 35 U.S.C. § 371, of International Application No. PCT/JP2019/038695, filed Oct. 1, 2019, the contents of which are incorporated by reference.

TECHNICAL FIELD

The present disclosure relates to an attachment structure of a brake disk, and more particularly relates to a structure that attaches an annular brake disk to a wheel of a railway vehicle or to a disk body that is to be fixed to an axle of a railway vehicle. The present disclosure also relates to a brake disk unit that uses the attachment structure.

BACKGROUND ART

Traditionally, disk brakes have been used as a braking device of a railway vehicle. A disk brake includes an annular brake disk and a brake lining. The brake disk is fastened to a wheel of a railway vehicle, or is fastened to a disk body that is to be fixed to an axle of a railway vehicle. The brake lining is pressed against a sliding surface of the brake disk. Friction between the brake disk and the brake lining applies a braking force to the wheel.

Patent Literature 1 discloses a brake disk that is fastened to each side face of a wheel by a bolt and a nut. An elastic element such as a coned disc spring is disposed between the brake disk and the head of the bolt or the nut. According to Patent Literature 1, a bending load and a tensile load applied to the bolt can be reduced by adjusting the modulus of elasticity of the elastic element to an appropriate amount.

Patent Literature 2 discloses a fastening structure for fastening a wheel or disk body and a brake disk. In the fastening structure, a coned disc spring is disposed between the brake disk and a nut. In a state in which the wheel or disk body and the brake disk are fastened together, the coned disc spring is disposed so that a concave surface thereof faces a seating surface of the nut, and contacts an outer peripheral portion of the seating surface of the nut. According to Patent Literature 2, by causing the coned disc spring to contact the outer peripheral portion of the seating surface of the nut, the concentration of stress at an R portion of the thread root of the bolt can be reduced.

Various kinds of elastic elements have been proposed as an elastic element to be disposed between members. For example, Patent Literature 3 discloses elastic elements that, when fastening a first member and a second member using a bolt, are disposed above and below the first member. In Patent Literature 3, each of the upper and lower elastic elements has a conical portion functioning as a coned disc spring. The elastic element on the upper side is fixed to the head of the bolt and the first member.

Further, for example, Patent Literature 4 discloses a washer (coned disc spring) that is interposed between an object to be fastened and the head of a bolt or a nut. The coned disc spring has a pressing portion and a spring portion. The pressing portion contacts the head of the bolt or the seating surface of the nut. The spring portion has a concave surface that faces the object to be fastened, and increases in diameter from the pressing portion toward the object to be fastened. The maximum outer diameter of the pressing portion is less than the maximum outer diameter of the spring portion. According to Patent Literature 4, by means of this configuration, a load acting on the pressing portion can be concentrated at the central part of the spring portion, and the spring portion can be compressively deformed in a reliable manner.

CITATION LIST

Patent Literature

Patent Literature 1: Japanese Patent No. 4305296
Patent Literature 2: Japanese Patent No. 4748390
Patent Literature 3: Japanese Patent Application Publication No. 2010-060031
Patent Literature 4: Japanese Patent Application Publication No. 2002-323029

SUMMARY OF INVENTION

Technical Problem

The brake disks for a railway vehicle as disclosed in Patent Literatures 1 and 2 are subjected to heat deformation caused by frictional heat that arises between the brake disk and the brake lining during braking of the wheel. Consequently, the load applied to the fastening member that fastens the brake disk to the wheel or a disk body increases. A coned disc spring (elastic element) as disclosed in the respective Patent Literatures mentioned above may be utilized to reduce the load on the fastening member. However, for example, in a center-fastening type brake disk in which a fastening portion is provided at the center of a sliding surface, the space in which to dispose a coned disc spring is limited, and hence there are cases where the spring constant of the coned disc spring cannot be made sufficiently small. As a result, there is a possibility that reduction of the load applied to the fastening member will be insufficient, and the fatigue strength of the fastening member will decrease.

An object of the present disclosure is to improve the fatigue strength of a fastening member in a brake disk for a railway vehicle that is to be fastened to an attachment object member by the fastening member.

Solution to Problem

An attachment structure according to the present disclosure is a structure that attaches an annular brake disk to an attachment object member. The attachment object member may be a wheel of a railway vehicle, or may be a disk body that is to be fixed to an axle of a railway vehicle. The attachment structure includes a fastening member and an elastic member. The fastening member fastens the brake disk to the attachment object member. The fastening member has a bolt and a nut. The bolt includes a shaft portion. The shaft portion passes through the brake disk and the attachment object member. The nut is attached to an end part of the shaft portion on the brake disk side. The elastic member is disposed between the nut and the brake disk. The elastic member includes a member body that has a tubular shape and a first flange. The shaft portion is inserted into the member body. The first flange is connected to an end part that is on the nut side among two end parts of the member body. The first flange protrudes outward from the member body and contacts an outer peripheral portion of the nut.

Advantageous Effects of Invention

According to the present disclosure, in a brake disk for a railway vehicle that is to be fastened to an attachment object member by a fastening member, the fatigue strength of the fastening member can be improved.

DESCRIPTION OF EMBODIMENTS

Figure 1:
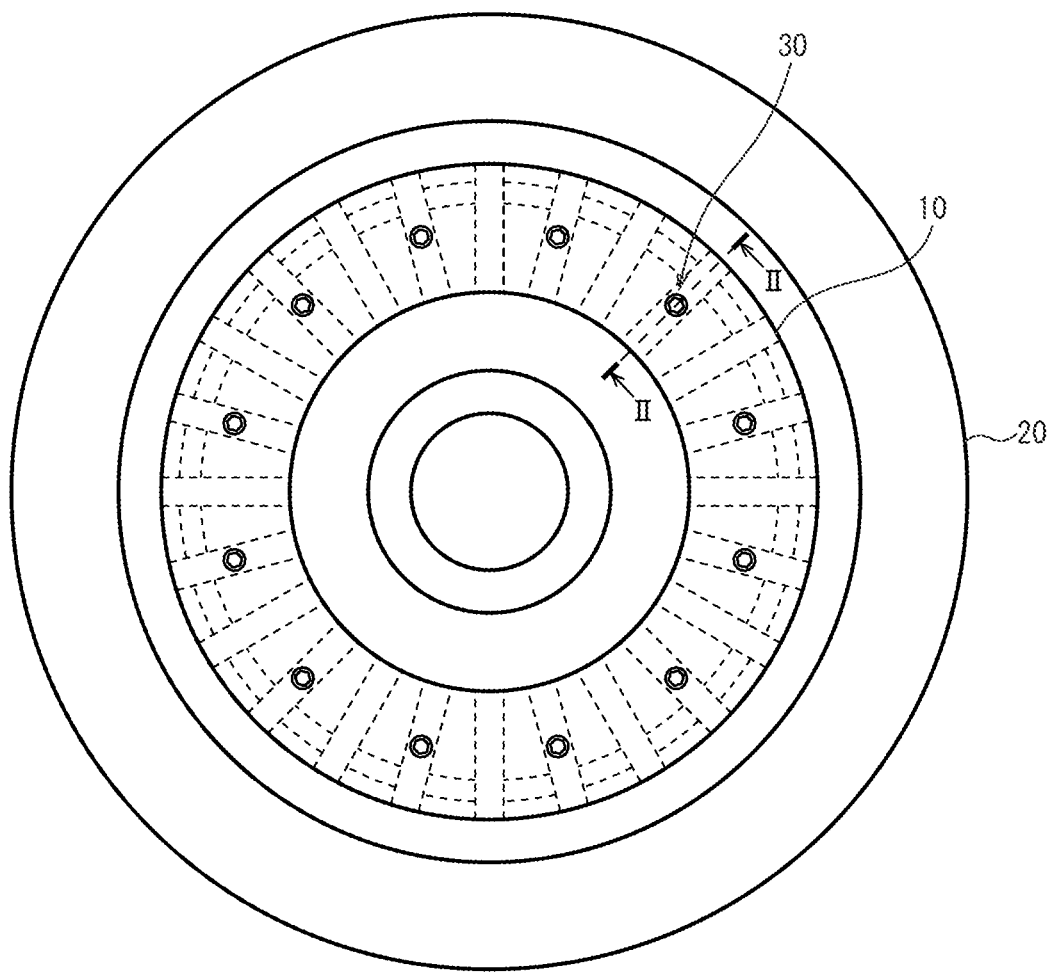
FIG. 1 is a plan view of a brake disk unit according to a first embodiment.

An attachment structure according to an embodiment is a structure that attaches an annular brake disk to an attachment object member. The attachment object member may be a wheel of a railway vehicle, or may be a disk body that is to be fixed to an axle of a railway vehicle. The attachment structure includes a fastening member and an elastic member. The fastening member fastens the brake disk to the attachment object member. The fastening member has a bolt and a nut. The bolt includes a shaft portion. The shaft portion passes through the brake disk and the attachment object member. The nut is attached to an end part of the shaft portion on the brake disk side. The elastic member is disposed between the nut and the brake disk. The elastic member includes a member body that has a tubular shape and a first flange. The shaft portion is inserted into the member body. The first flange is connected to an end part that is on the nut side among two end parts of the member body. The first flange protrudes outward from the member body, and contacts an outer peripheral portion of the nut (first configuration).

In the first configuration, an elastic member having a member body and a first flange is disposed between a nut of a fastening member and a brake disk. The elastic member is interposed between the nut that is to be attached to the shaft portion of a bolt and the brake disk, and absorbs deformation of the fastening member that accompanies deformation of the brake disk. Specifically, when the brake disk deforms due to frictional heat between the brake disk and the brake lining or the like and a compressive load acts on the elastic member, the first flange deflects and the elastic member deforms by a large amount overall. By this means, since deformation of the fastening member that accompanies deformation of the brake disk is absorbed by the elastic member, the load applied to the fastening member can be reduced.

In the first configuration, the first flange of the elastic member contacts the nut of the fastening member. The first flange protrudes outward from the member body that is tubular, and contacts an outer peripheral portion of the nut. Therefore, in the fastening member, an inner peripheral portion of the nut, that is, a connecting portion between the nut and the shaft portion of the bolt is not restrained by the elastic member, and deformation of the nut and the shaft portion is allowed. Hence, stress that arises in the fastening member is alleviated, and the load applied to the fastening member can be reduced.

Thus, according to the first configuration, in a brake disk for a railway vehicle that is to be fastened to an attachment object member by a fastening member, the load applied to the fastening member can be reduced, and hence the fatigue strength of the fastening member can be improved.

In the attachment structure described above, the outer peripheral surface of the elastic member can include, in longitudinal sectional view of the elastic member, a first curved portion. The first curved portion connects the member body and the first flange (second configuration).

According to the second configuration, in the outer peripheral surface of the elastic member, the member body and the first flange are connected by a first curved portion. Therefore, when a compressive load acts on the elastic member and the first flange deflects, the occurrence of a situation in which stress concentrates at a base (connecting portion with the member body) of the first flange can be prevented.

In the attachment structure described above, the elastic member can further include a second flange. The second flange is connected to an end part that is on an opposite side to the first flange among the two end parts of the member body. The second flange protrudes outward from the member body and contacts the brake disk (third configuration).

According to the third configuration, in the elastic member, the first and second flanges are provided at the two end parts of the tubular member body, respectively. Thus, when a compressive load caused by deformation of the brake disk acts on the elastic member, the second flange also deflects in addition to the first flange, and therefore the elastic member deforms to a greater extent. Hence, deformation of the fastening member accompanying deformation of the brake disk can be absorbed more reliably by the elastic member, and the load applied to the fastening member can be reduced to a greater extent.

In the third configuration, the outer peripheral surface of the elastic member can include, in longitudinal sectional view of the elastic member, a second curved portion. The second curved portion connects the member body and the second flange (fourth configuration).

According to the fourth configuration, in the outer peripheral surface of the elastic member, the member body and the second flange are connected by a second curved portion. Therefore, when a compressive load acts on the elastic member and the second flange deflects, the occurrence of a situation in which stress concentrates at a base (connecting portion with the member body) of the second flange can be prevented.

A brake disk unit according to an embodiment is a brake disk unit for a railway vehicle. The brake disk unit includes the aforementioned brake disk, the aforementioned attachment object member, and the attachment structure according to any one of the first to fourth configurations.

Embodiments of the present disclosure are described hereunder while referring to the accompanying drawings. In the drawings, the same reference symbols are assigned to the same or equivalent parts, and a description thereof is not repeated.

First Embodiment

[Configuration of Brake Disk Unit]

First, a first embodiment of the present disclosure will be described. FIG. 1 is a plan view of a brake disk unit 100 according to the first embodiment. The brake disk unit 100 is used in a railway vehicle.

As illustrated in FIG. 1, the brake disk unit 100 includes a brake disk 10, an attachment object member 20, and a plurality of attachment structures 30.

The brake disk 10 has an annular shape. The brake disk 10 is attached to the attachment object member 20 by the attachment structures 30. The attachment structures 30 are arranged along the circumferential direction of the brake disk 10.

In the present embodiment, the attachment object member 20 is a wheel of a railway vehicle. The attachment object member 20 may also be a disk body which is fixed to an axle of a railway vehicle. The brake disk 10 is provided so as to be substantially coaxial with the attachment object member 20. The brake disk 10 is disposed on each side face of the attachment object member 20.

The material of the brake disk 10 and the attachment object member 20 is not particularly limited. For example, a material that is generally used for a brake disk, such as steel or an aluminum composite material can be employed as the material of the brake disk 10. Similarly, a material that is generally used for a wheel or a disk body for a railway vehicle can be employed as the material of the attachment object member 20.

Figure 2:
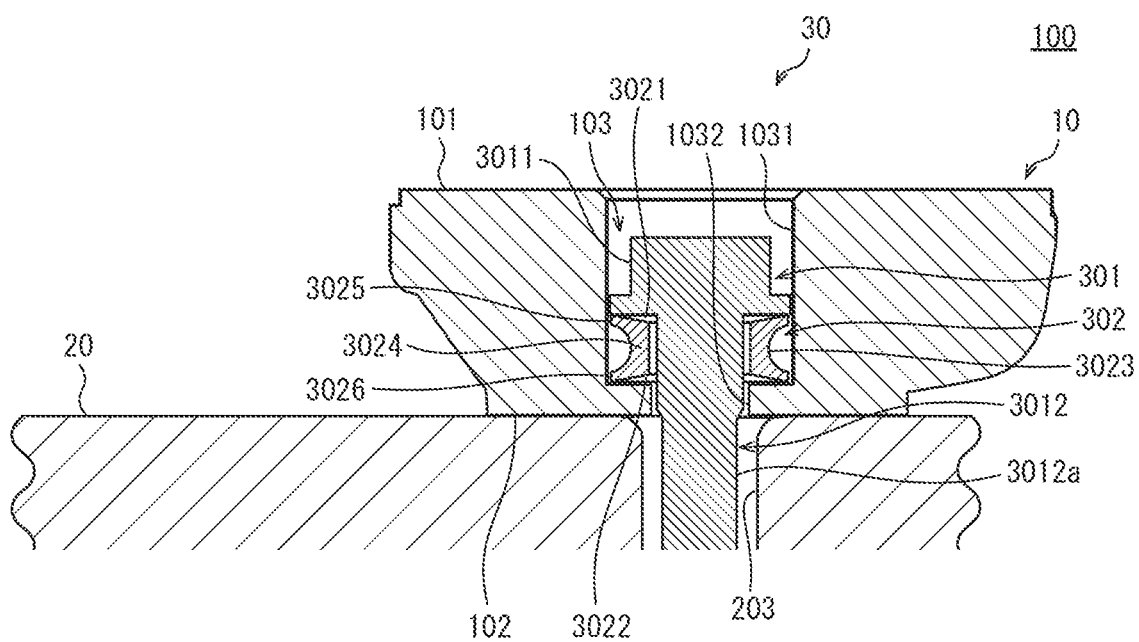
FIG. 2 is a cross-sectional view along a line II-II of the brake disk unit illustrated in FIG. 1.

FIG. 2 is a cross-sectional view along a line II-II of the brake disk unit 100 illustrated in FIG. 1. In FIG. 2, only one of the brake disks 10 attached to the two side faces of the attachment object member 20 is illustrated, and the other brake disk 10 is omitted from the illustration.

Referring to FIG. 2, the brake disk 10 includes a front face 101 and a rear face 102. The front face 101 is a face that faces outward in the thickness direction of the brake disk unit 100. The front face 101 is a sliding surface which a brake lining (not illustrated in the drawings) is pressed against. The rear face 102 faces a side face of the attachment object member 20. In a case where the brake disk 10 has a plurality of vertical fins extending in the radial direction, the rear face 102 includes the top face of the respective vertical fins.

The thickness direction of the brake disk unit 100 is the stacking direction of the brake disk 10 and the attachment object member 20, and matches the respective thickness directions of the brake disk 10 and the attachment object member 20. Hereunder, the thickness direction of the brake disk unit 100, the brake disk 10, or the attachment object member 20 may be referred to simply as "thickness direction". Further, the radial direction of the brake disk unit 100, the brake disk 10, or the attachment object member 20 may be referred to simply as "radial direction".

The brake disk 10 includes a plurality of fastening holes 103. The plurality of fastening holes 103 are formed along the circumferential direction of the brake disk 10, with a space therebetween. Each of the fastening holes 103 is a through-hole that penetrates through the brake disk 10 in the thickness direction.

Each fastening hole 103 includes a large-diameter portion 1031 and a small-diameter portion 1032. The diameter of the large-diameter portion 1031 is larger than the diameter of the small-diameter portion 1032. The large-diameter portion 1031 and the small-diameter portion 1032 are disposed in that order from the front face 101 toward the rear face 102 of the brake disk 10. The large-diameter portion 1031 opens in the front face 101. The small-diameter portion 1032 opens in the rear face 102.

The attachment object member 20 has a plurality of fastening holes 203. The plurality of fastening holes 203 are formed in the attachment object member 20 in correspondence with the plurality of fastening holes 103 of the brake disk 10. The brake disks 10 are attached to both side faces of the attachment object member 20. Therefore, the fastening holes 103 of one of the brake disks 10, the fastening holes 203 of the attachment object member 20, and the fastening holes of another brake disk (not illustrated in the drawings) are aligned in that order in the thickness direction.

Each attachment structure 30 is a structure for attaching the brake disk 10 to the attachment object member 20. The attachment structure 30 is provided for each of the fastening holes 103 of the brake disk 10. The attachment structure 30 includes a fastening member 301 and an elastic member 302.

The fastening member 301 fastens the brake disk 10 to the attachment object member 20. The fastening member 301 is inserted into the fastening hole 103 of the brake disk 10, and the fastening hole 203 of the attachment object member 20. The fastening member 301 has a nut 3011 and a bolt 3012.

The nut 3011 is accommodated in the fastening hole 103 of the brake disk 10. More specifically, the nut 3011 is disposed in the large-diameter portion 1031 of the fastening hole 103.

The bolt 3012 includes a shaft portion 3012a. The shaft portion 3012a extends toward the attachment object member 20 side from the nut 3011. The shaft portion 3012a passes through the brake disk 10 and the attachment object member 20 to extend in thickness direction.

The shaft portion 3012a is inserted into the fastening hole 103 of the brake disk 10 and the fastening hole 203 of the attachment object member 20. More specifically, the shaft portion 3012a is inserted through the fastening hole 103 of the brake disk 10, the fastening hole 203 of the attachment object member 20, and the fastening hole of the other brake disk (not illustrated in the drawings).

The nut 3011 is attached to one end part of the shaft portion 3012a. The bolt 3012 has a head (not illustrated in the drawings) at the other end part of the shaft portion 3012a. The shaft portion 3012a has, at least, a thread part at an end part on the nut 3011 side. The nut 3011 has a thread part corresponding to the thread part of the shaft portion 3012a. The thread part of the shaft portion 3012a engages with the thread part of the nut 3011.

The elastic member 302 is disposed between the nut 3011 of the fastening member 301 and the brake disk 10. The elastic member 302 is disposed over the fastening hole 103 of the brake disk 10. In the present embodiment, the elastic member 302 is accommodated in the fastening hole 103.

The elastic member 302 includes a top surface 3021, a bottom surface 3022 and an outer peripheral surface 3023. The top surface 3021 faces the seating surface of the nut 3011 of the fastening member 301. The bottom surface 3022 faces the bottom surface of the large-diameter portion 1031 of the fastening hole 103. The outer peripheral surface 3023 faces the inner wall surface of the large-diameter portion 1031. The outer peripheral surface 3023 connects the outer peripheral edge of the top surface 3021 and the outer peripheral edge of the bottom surface 3022.

The elastic member 302 includes a member body 3024, and flanges 3025 and 3026 which protrude outward from the member body 3024.

The member body 3024 has a tubular shape. The shaft portion 3012a of the fastening member 301 is inserted into the member body 3024.

The flange 3025 is provided at an end part that, among the two end parts of the member body 3024, is closer to the nut 3011 of the fastening member 301. The flange 3025 extends outward from the member body 3024. The flange 3025 comes progressively closer to the seating surface of the nut 3011 as the flange 3025 extends toward the outer peripheral side of the elastic member 302. The flange 3025 contacts an outer peripheral portion of the seating surface of the nut 3011.

The flange 3026 is provided at an end part that, among the two end parts of the member body 3024, is on the opposite side to the flange 3025. The flange 3026 extends to the outer circumferential side of the elastic member 302 from the member body 3024. The flange 3026 comes progressively closer to the bottom surface of the large-diameter portion 1031 of the fastening hole 103 as the flange 3026 extends toward the outer peripheral side of the elastic member 302. The flange 3026 contacts an outer peripheral portion of the bottom surface of the large-diameter portion 1031.

Figure 3:
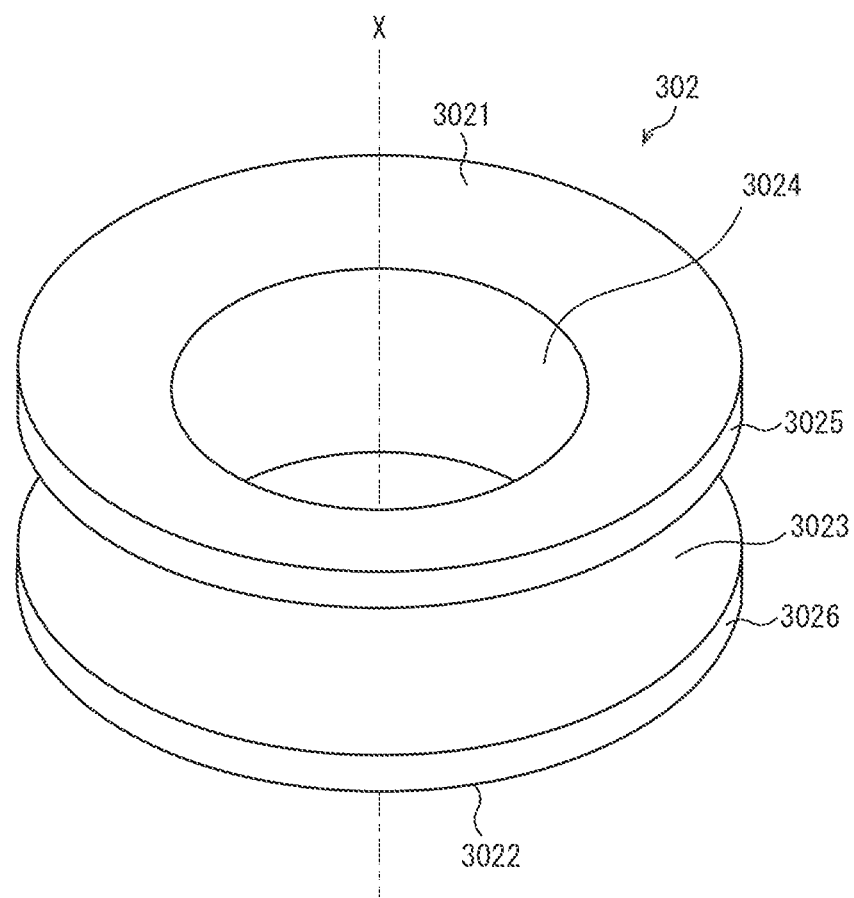
FIG. 3 is a perspective view of an elastic member included in the brake disk unit illustrated in FIG. 1.
Figure 4:
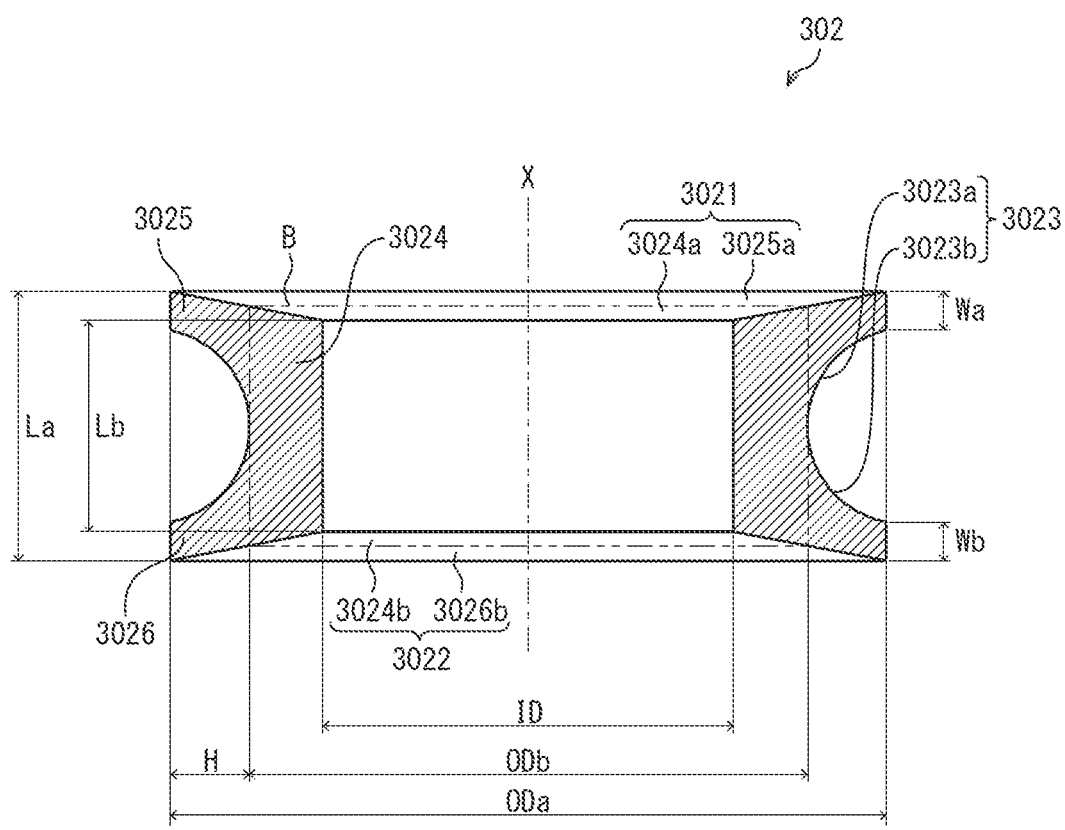
FIG. 4 is a longitudinal sectional view of the elastic member illustrated in FIG. 3.

Hereunder, the elastic member 302 is described in more detail while referring to FIG. 3 and FIG. 4.

FIG. 3 is a perspective view of the elastic member 302. FIG. 4 is a cross-sectional view of the elastic member 302 cut along a plane including a central axis X. Hereunder, with respect to the elastic member 302, a cross-section cut along a plane including the central axis X is referred to as a "longitudinal section", and a cross-section cut along a plane that is orthogonal to the central axis X is referred to as a "transverse section". Further, with respect to the elastic member 302, the direction in which the central axis X extends is referred to as "axial direction", a direction that is orthogonal to the central axis X is referred to as "radial direction" or "transverse direction", the top surface 3021 side is referred to as "up" and the bottom surface 3022 side is referred to as "down".

Referring to FIG. 3 and FIG. 4, the elastic member 302, for example, has substantially a cylindrical shape. In the present embodiment, the outer diameter of the elastic member 302 decreases progressively from both end parts in the axial direction toward the center part thereof. In other words, as illustrated in FIG. 4, the elastic member 302 has a maximum outer diameter ODa at the two end parts in the axial direction, and has a minimum outer diameter ODb at the center part in the axial direction. The elastic member 302 has a substantially constant inner diameter ID over the entire axial direction.

The maximum outer diameter ODa of the elastic member 302 is equal to or less than the diameter of the seating surface of the nut 3011 (FIG. 2) of the fastening member 301. In a case where the shape of the seating surface of the nut 3011 is not circular, the maximum outer diameter ODa of the elastic member 302 is equal to or less than the length from one side to the other side of the seating surface of the nut 3011. The phrase "length from one side to the other side of the seating surface of the nut 3011" refers to the maximum dimension of the seating surface of the nut 3011. In a case where the shape of the elastic member 302 is a polygonal tubular shape or the like, the maximum dimension in the transverse direction of the elastic member 302 is equal to or less than the diameter or length from one side to the other side of the seating surface of the nut 3011.

In the elastic member 302, the member body 3024 and the flanges 3025 and 3026 are formed integrally. In FIG. 4, the boundary between the member body 3024 and the flanges 3025 and 3026 is indicated by a chain double-dashed line B. In the elastic member 302, a cylindrical portion enclosed by the chain double-dashed line B is the member body 3024, and portions that protrude outward from the cylindrical portion are the flanges 3025 and 3026. The member body 3024 has a substantially constant outer diameter ODb and inner diameter ID over the entire axial direction. The flanges 3025 and 3026 are each formed in a substantially annular shape, and each have an outer diameter ODa.

The flange 3025 is connected to an upper part of the member body 3024. The flange 3025 protrudes toward the outer side of the member body 3024 in the radial direction of the elastic member 302, and extends somewhat upwards. A top surface 3025a of the flange 3025 constitutes the top surface 3021 of the elastic member 302, together with a top surface 3024a of the member body 3024. The top surface 3024a of the member body 3024 rises progressively toward the outer side in the radial direction of the elastic member 302. The top surface 3025a of the flange 3025 is continuous with the top surface 3024a of the member body 3024, and rises progressively toward the outer side in the radial direction of the elastic member 302. In other words, the top surface 3021 of the elastic member 302 is a tapered face that inclines upward moderately toward the outer side from the inner side in the radial direction. However, the shape of the top surface 3021 is not limited to this shape. In the top surface 3021, it suffices that the outer portion is located more upward than the inner portion in the radial direction, and for example a protrusion that protrudes upward may be provided at an outer portion (outer peripheral portion) in the radial direction.

The flange 3026 is connected to a lower part of the member body 3024. The flange 3026 protrudes toward the outer side of the member body 3024 in the radial direction of the elastic member 302, and extends somewhat downwards. A bottom surface 3026b of the flange 3026 constitutes the bottom surface 3022 of the elastic member 302, together with a bottom surface 3024b of the member body 3024. The bottom surface 3024b of the member body 3024 descends progressively toward the outer side in the radial direction of the elastic member 302. The bottom surface 3026b of the flange 3026 is continuous with the bottom surface 3024b of the member body 3024, and descends progressively toward the outer side in the radial direction of the elastic member 302. In other words, the bottom surface 3022 of the elastic member 302 is a tapered face that inclines downward moderately toward the outer side from the inner side in the radial direction. However, the shape of the bottom surface 3022 is not limited to this shape. In the bottom surface 3022, it suffices that the outer portion is located more downward than the inner portion in the radial direction, and for example a protrusion that protrudes downward may be provided at an outer portion (outer peripheral portion) in the radial direction.

The outer peripheral surface 3023 of the elastic member 302 includes, in longitudinal sectional view of the elastic member 302, curved portions 3023a and 3023b. The curved portion 3023a is disposed at an upper part of the outer peripheral surface 3023. The curved portion 3023a smoothly connects the member body 3024 and the flange 3025 on the upper side. The curved portion 3023b is disposed at the lower part of the outer peripheral surface 3023. The curved portion 3023b smoothly connects the member body 3024 and the flange 3026 on the lower side.

In the present embodiment, the outer peripheral surface 3023 is constituted by, in longitudinal sectional view of the elastic member 302, only the curved portions 3023a and 3023b which have the same radius of curvature. In other words, the outer peripheral surface 3023 is, as a whole, a single circular arc surface that is concave on the inner side in the radial direction of the elastic member 302. However, the outer peripheral surface 3023 need not necessarily be constituted by only the curved portions 3023a and 3023b, and may include a straight portion in longitudinal sectional view of the elastic member 302. Further, the radius of curvature of the curved portion 3023a and the radius of curvature of the curved portion 3023b may be different to each other. Although each of the curved portions 3023a and 3023b may be a single circular arc as in the present embodiment, the curved portions 3023a and 3023b may each be constituted by a plurality of circular arcs having different radii of curvature.

The flanges 3025 and 3026 have flange widths Wa and Wb, respectively. The flange width Wa is the dimension in the axial direction of an outer circumferential edge part of the flange 3025. The flange width Wb is the dimension in the axial direction of an outer circumferential edge part of the flange 3026. Although the dimensions will depend on the usage conditions and the like of the brake disk unit 100 (FIG. 2), for example, the flange widths Wa and Wb can be set in the range of 2 mm to 4 mm.

The flanges 3025 and 3026 have a flange height H. Although in the present embodiment the flanges 3025 and 3026 have the same flange height H, the flanges 3025 and 3026 may have different flange heights to each other. The flange height H is the protruding height of the flanges 3025 and 3026 in the outward direction from the member body 3024, and is the maximum dimension of the flanges 3025 and 3026 in the radial direction of the elastic member 302. Although the dimension will depend on the usage conditions and the like of the brake disk unit 100 (FIG. 2), the flange height H is preferably 5 mm or less. By setting the flange height H to 5 mm or less, stress arising in the fastening member 301 (FIG. 2) can be reliably decreased. The flange height H is preferably 1 mm or more so that the spring constant of the elastic member 302 does not become large.

The wall thickness of the member body 3024, that is, the difference between the outer diameter ODb and the inner diameter ID can be set within a range of, for example, 5 mm to 15 mm. Further, for example, a maximum length La in the axial direction of the elastic member 302 can be set within a range of 6 mm to 20 mm, and a minimum length Lb in the axial direction can be set within a range of 2 mm to 16 mm.

[Effects]

In the brake disk unit 100 according to the present embodiment, the elastic member 302 is disposed between the nut 3011 of the fastening member 301 and the brake disk 10. When a compressive load caused by heat deformation of the brake disk 10 acts on the elastic member 302, the flanges 3025 and 3026 in the elastic member 302 deflect to the center side in the axial direction and deformation of the fastening member 301 accompanying deformation of the brake disk 10 is absorbed. Hence, the load applied to the fastening member 301 can be reduced, and the fatigue strength of the fastening member 301 can be improved.

The elastic member 302 contacts the outer peripheral portion of the nut 3011 of the fastening member 301 at the flange 3025. The elastic member 302 does not contact the inner peripheral portion of the nut 3011. Therefore, in the fastening member 301, a connecting portion between the nut 3011 and the shaft portion 3012a of the bolt 3012 is not restrained by the elastic member 302, and deformation of the nut 3011 and the shaft portion 3012a is allowed. Hence, stress that arises in the fastening member 301 is alleviated, and the load applied to the fastening member 301 can be reduced.

The attachment structure 30 according to the present embodiment is employed in the center-fastening type brake disk 10 in which a fastening portion is provided in the center of the front face (sliding surface) 101. In the center-fastening type brake disk 10, the nut 3011 of the fastening member 301 and the elastic member 302 are accommodated within the large-diameter portion 1031 of the fastening hole 103. Therefore, the maximum outer diameter ODa of the elastic member 302 is, by necessity, less than or equal to the diameter or the length from one side to the other side of the seating surface of the nut 3011. When such a constraint exists with respect to the outer diameter, it is difficult to realize a low spring constant by using a common coned disc spring, and therefore in some cases the load applied to the fastening member 301 cannot be sufficiently reduced. In contrast, because the elastic member 302 of the present embodiment has the flanges 3025 and 3026 at both end parts in the axial direction, in comparison to a common coned disc spring having the same outer diameter, the amount of deformation is large and the elastic member 302 can have a low spring constant. Hence, even in the center-fastening type brake disk 10 in which a constraint arises with respect to the outer diameter of the elastic member 302, a load applied to the fastening member 301 can be sufficiently reduced.

In the case of the center-fastening type brake disk 10, because the fastening member 301 is accommodated in the fastening hole 103, there is a constraint with respect to the dimensions of the fastening member 301, and it is difficult to increase the strength of the fastening member 301 itself. Further, in the center-fastening type brake disk 10, because the fastening hole 103 is formed in the front face (sliding surface) 101 at which there is heat input, there is a tendency for the load applied to the fastening member 301 that is caused by heat deformation of the brake disk 10 to become large. Therefore, it is particularly preferable for the attachment structure 30 according to the present embodiment to be applied to the center-fastening type brake disk 10. In other words, according to the attachment structure 30, because the elastic member 302 can be deformed by a large amount by deflection of the flanges 3025 and 3026, heat deformation of the brake disk 10 can be absorbed and enlargement of the load applied to the fastening member 301 can be prevented. However, the attachment structure 30 can also be applied to a brake disk of a different type to a center-fastening type brake disk.

In the present embodiment, the flanges 3025 and 3026 are provided at the two end parts in the axial direction of the elastic member 302, respectively. In other words, the elastic member 302 is formed so as to be substantially symmetrical vertically. Therefore, when assembling the brake disk unit 100, a worker need not be conscious of the upper and lower sides of the elastic member 302, and thus the work properties can be improved.

In the present embodiment, the elastic member 302 includes, in longitudinal sectional view, the curved portions 3023a and 3023b in the outer peripheral surface 3023. The curved portions 3023a and 3023b smoothly connect the flanges 3025 and 3026 and the member body 3024. Hence, when the flanges 3025 and 3026 are deflected due to a compressive load, the occurrence of stress concentration at the base of the flanges 3025 and 3026 can be inhibited, and damage of the flanges 3025 and 3026 can be prevented.

Second Embodiment

Figure 5:
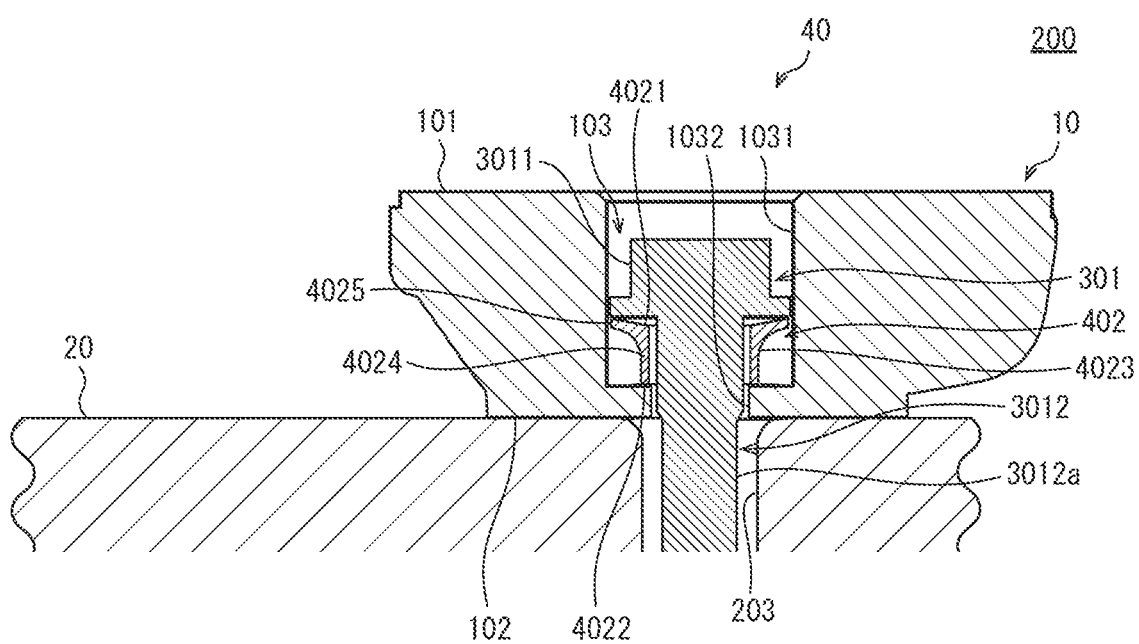
FIG. 5 is a cross-sectional view illustrating a portion of a brake disk unit according to a second embodiment.
Figure 6:
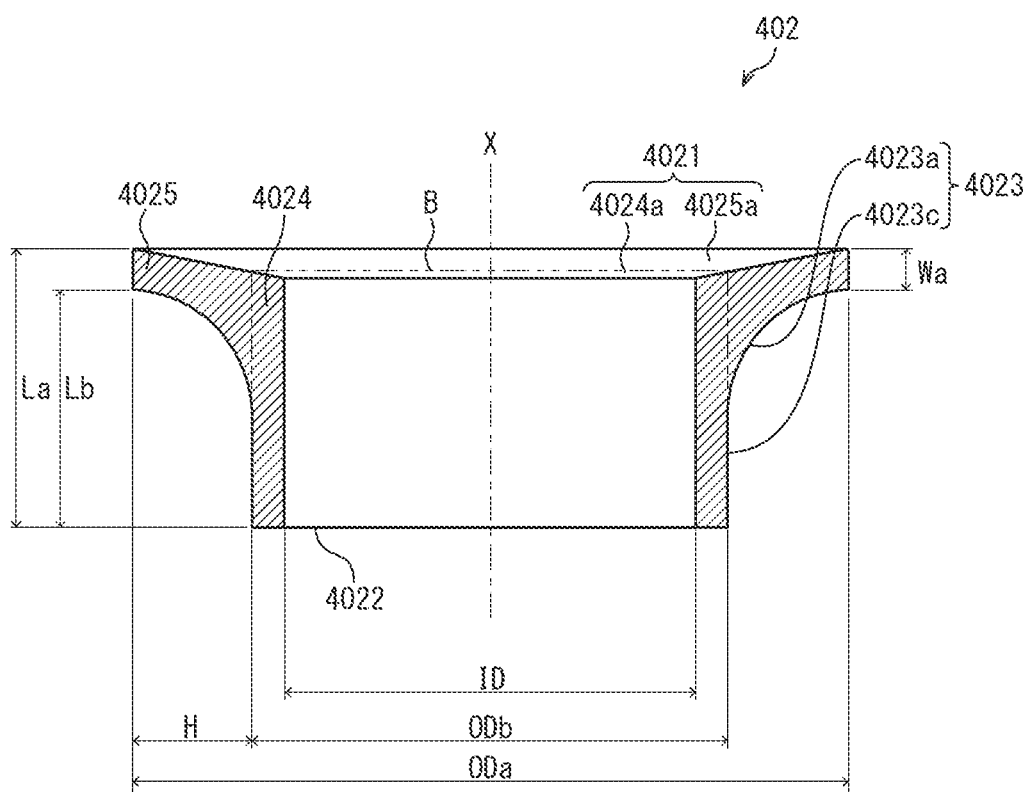
FIG. 6 is a longitudinal sectional view of an elastic member included in the brake disk unit illustrated in FIG. 5.

Next, a second embodiment of the present disclosure will be described. FIG. 5 is a cross-sectional view illustrating an attachment structure 40 of a brake disk unit 200 according to the second embodiment. FIG. 6 is a longitudinal sectional view illustrating an elastic member 402 included in the attachment structure 40. The brake disk unit 200 according to the second embodiment differs from the brake disk unit 100 (FIG. 2) of the first embodiment with regard to the shape of the elastic member 402 of the attachment structure 40.

As illustrated in FIG. 5, similarly to the first embodiment, the elastic member 402 includes a top surface 4021, a bottom surface 4022 and an outer peripheral surface 4023. Similarly to the first embodiment, the elastic member 402 includes a member body 4024 having a tubular shape, and a flange 4025 on the top surface 4021 side. Unlike the first embodiment, the elastic member 402 does not have a flange on the bottom surface 4022 side.

Among the two end parts of the member body 4024, the flange 4025 is provided at the end part on the side of the nut 3011 of the fastening member 301. The flange 4025 extends to the outer circumferential side of the elastic member 402 and the nut 3011 side from the member body 4024, and contacts the outer peripheral portion of the seating surface of the nut 3011.

Referring to FIG. 6, the flange 4025 of the upper part of the elastic member 402 has a similar configuration to the flange 3025 (FIG. 3 and FIG. 4) of the first embodiment. The flange 4025 protrudes to the outward side of the member body 4024 in the radial direction of the elastic member 402. A top surface 4025a of the flange 4025 constitutes the taper-shaped top surface 4021, together with a top surface 4024a of the member body 4024. On the other hand, because a flange is not present at the lower part of the elastic member 402, the bottom surface 4022 of the elastic member 402 is constituted by only the bottom surface of the member body 4024. The bottom surface 4022 is an annular surface that is substantially parallel to the radial direction of the elastic member 402.

The outer peripheral surface 4023 includes, in longitudinal sectional view of the elastic member 402, a curved portion 4023a and a straight portion 4023c. The curved portion 4023a is disposed at the upper part of the outer peripheral surface 4023. The curved portion 4023a smoothly connects the member body 4024 and the flange 4025. The curved portion 4023a may be a single circular arc, or may be constituted by a plurality of circular arcs having different radii of curvature. The straight portion 4023c extends in a straight line from the curved portion 4023a toward the bottom surface 4022, along the axial direction of the elastic member 402.

Thus, in the present embodiment, the flange 4025 is provided at only one of the two end parts in the axial direction of the elastic member 402. Hence, when the brake disk 10 deforms and a compressive load acts on the elastic member 402, the flange 4025 deflects to the center side in the axial direction and deformation of the brake disk 10 is absorbed. Therefore, the load applied to the fastening member 301 can be reduced.

The elastic member 402 contacts the outer peripheral portion of the nut 3011 of the fastening member 301 at the flange 4025, and does not contact the inner peripheral portion of the nut 3011. The elastic member 402 does not restrain a connecting portion between the nut 3011 and the shaft portion 3012a of the bolt 3012, and allows deformation of the nut 3011 and the shaft portion 3012a. Hence, stress that arises at the fastening member 301 can be alleviated, and a load applied to the fastening member 301 can be reduced.

Thus, in the present embodiment also, similarly to the first embodiment, a load applied to the fastening member 301 can be reduced, and the fatigue strength of the fastening member 301 can be improved.

Embodiments according to the present disclosure have been described above. However, the present disclosure is not limited to the above embodiments, and various changes are possible within a range that does not deviate from the gist of the present disclosure.

For example, in the above first embodiment, the elastic member 302 has a substantially constant inner diameter ID over the entire axial direction. However, the inner diameter ID of the elastic member 302 need not be constant.

Figure 7:
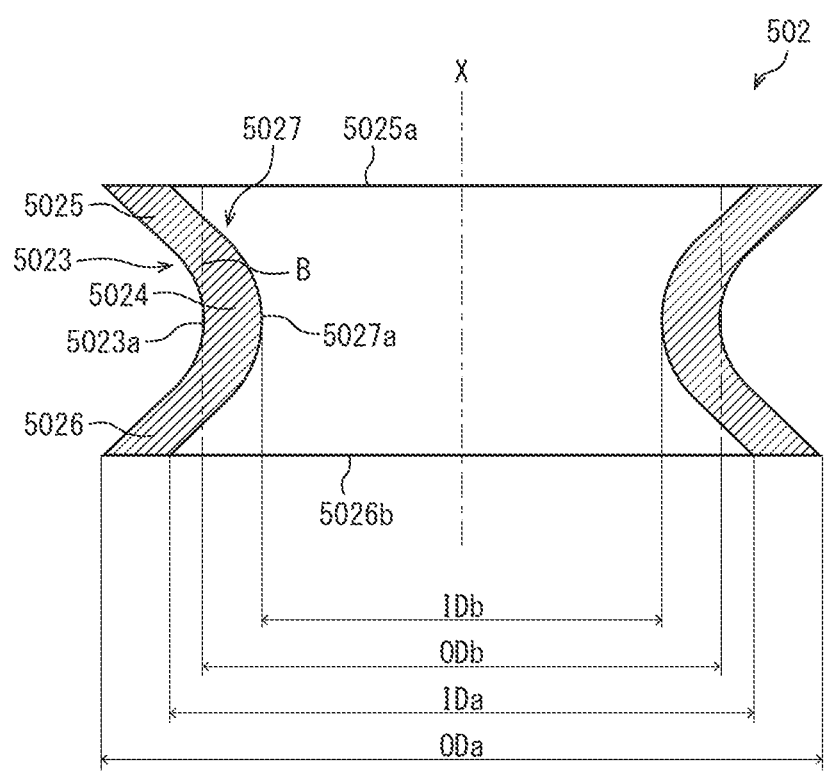
FIG. 7 is a longitudinal sectional view illustrating a modification of the elastic member illustrated in FIG. 3 and FIG. 4.

FIG. 7 is a longitudinal sectional view of an elastic member 502 according to a modification of the elastic member 302 (FIG. 4) in the first embodiment. As illustrated in FIG. 7, the inner diameter and the outer diameter of the elastic member 502 become progressively smaller toward the center part from the two end parts in the axial direction. In other words, the elastic member 502 has a maximum inner diameter IDa at both end parts in the axial direction, and has a minimum inner diameter IDb at the center part in the axial direction. Further, similarly to the elastic member 302 in the first embodiment, the elastic member 502 has a maximum outer diameter ODa at both end parts in the axial direction, and has a minimum outer diameter ODb at the center part in the axial direction.

In the elastic member 502, one flange 5025 extends outward and upward from a member body 5024. Therefore, in the brake disk unit 100 illustrated in FIG. 2, a top surface 5025a of the flange 5025 will contact the outer peripheral portion of the seating surface of the nut 3011. In the example illustrated in FIG. 7, the top surface 5025a is substantially parallel to the radial direction of the elastic member 502. However, similarly to the first embodiment, the top surface 5025a may incline so as to rise progressively toward the outer side in the radial direction of the elastic member 502.

The other flange 5026 extends outward and downward from the member body 5024. Therefore, in the brake disk unit 100 illustrated in FIG. 2, a bottom surface 5026b of the flange 5026 will contact the outer peripheral portion of the bottom surface of the large-diameter portion 1031 of the fastening hole 103. In the example illustrated in FIG. 7, the bottom surface 5026b is substantially parallel to the radial direction of the elastic member 502. However, similarly to the first embodiment, the bottom surface 5026b may incline so as to descend progressively toward the outer side in the radial direction of the elastic member 502.

The member body 5024 and the flanges 5025 and 5026 are smoothly connected by curved portions 5023a and 5027a provided in an outer peripheral surface 5023 and an inner peripheral surface 5027, respectively, of the elastic member 502.

Furthermore, for example, in the respective embodiments described above, the flanges 3025 and 4025 of the elastic members 302 and 402 extend outward from the member bodies 3024 and 4024. However, it suffices that the flanges 3025 and 4025 can protrude from the member bodies 3024 and 4024 and contact the outer peripheral portion of the nut 3011, and the flanges 3025 and 4025 are not limited to the flanges described in each of the above embodiments.

Figure 8:
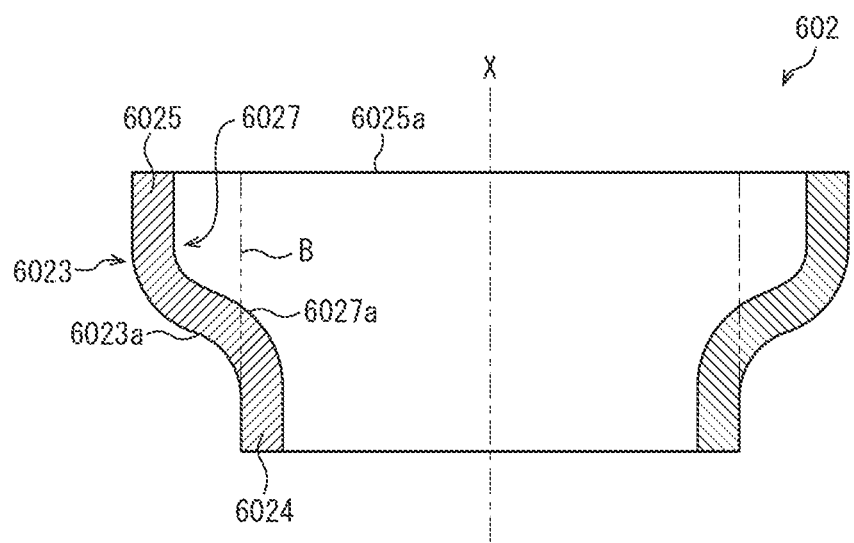
FIG. 8 is a longitudinal sectional view illustrating a modification of the elastic member illustrated in FIG. 6.

FIG. 8 is a longitudinal sectional view illustrating an elastic member 602 according to a modification of the elastic member 402 (FIG. 6) in the second embodiment. As illustrated in FIG. 8, in the elastic member 602, a flange 6025 protrudes outward from a member body 6024. The flange 6025 extends substantially in the axial direction of the member body 6024. Because the flange 6025 is disposed further on the outward side than the member body 6024 in the radial direction of the elastic member 602, in the brake disk unit 100 illustrated in FIG. 2, the flange 6025 will contact the outer peripheral portion of the seating surface of the nut 3011. In the example illustrated in FIG. 8, a top surface 6025a of the flange 6025 is substantially parallel to the radial direction of the elastic member 602. However, similarly to the second embodiment, the top surface 6025a may incline so as to rise progressively toward the outer side in the radial direction of the elastic member 602. The member body 6024 and the flange 6025 are smoothly connected by curved portions 6023a and 6027a provided in an outer peripheral surface 6023 and an inner peripheral surface 6027, respectively, of the elastic member 602.

In the brake disk units 100 and 200 according to the respective embodiments described above, any one of the elastic members 302, 402, 502 and 602 can also be disposed between a brake disk (not illustrated in the drawings) that is attached on the opposite side from the brake disk 10 illustrated in FIG. 2 and FIG. 5 to the attachment object member 20, and the head (not illustrated in the drawings) of the bolt 3012. With respect to the elastic member 402 or the elastic member 602, whilst the flange 4025 or 6025 may be disposed facing toward the head of the bolt 3012, the flange 4025 or 6025 may also be disposed facing toward the brake disk side. In other words, in the elastic member 402 or the elastic member 602, the bottom surface may contact the inner peripheral portion of the seating surface of the head of the bolt 3012. A common coned disc spring can also be disposed between the brake disk and the head of the bolt 3012 instead of the elastic member 302, 402, 502 or 602.

EXAMPLE

Hereunder, the present disclosure is described in further detail by way of an example. However, the present disclosure is not limited to the following example.

A model having a center-fastening type brake disk for the Shinkansen train (also known as the Japanese "Bullet Train"), and an attachment structure for attaching the brake disk to an attachment object member was prepared, and an analysis (FEM analysis) was performed by the finite element method. The model had the same configuration as the brake disk unit 100 illustrated in FIG. 2.

In the FEM analysis, a case in which a stopping brake was applied when a railway vehicle was travelling at 360 km/h was assumed, and the maximum stress arising in the fastening member 301 was calculated. In the FEM analysis, the flange widths Wa and Wb of the elastic member 302 were made constant, and the flange height H was changed between values of 2.3 mm, 2.9 mm and 4.8 mm, and the maximum stress for each flange height H was calculated.

Figure 9:
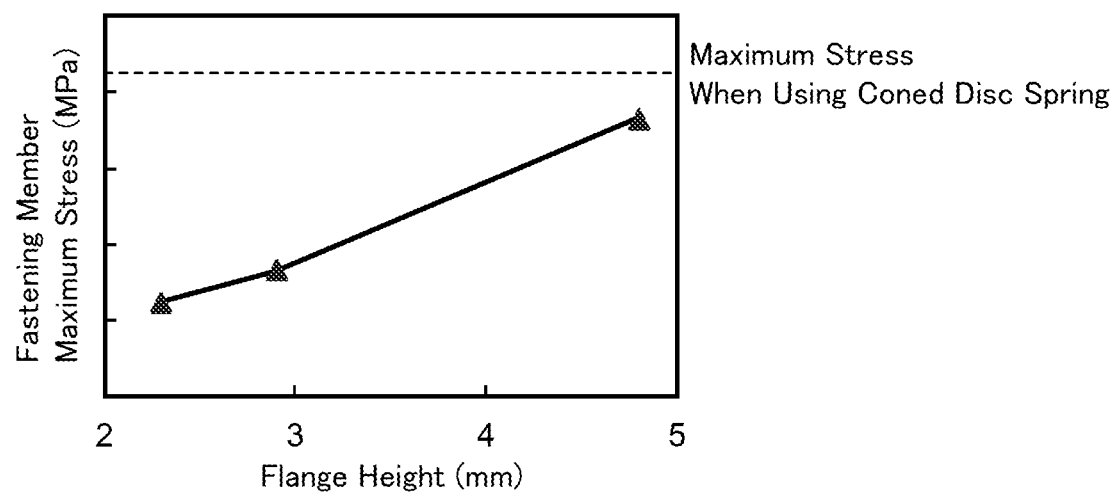
FIG. 9 is a graph illustrating the relation between the flange height of an elastic member according to an example, and maximum stress that arises in a fastening member.

FIG. 9 is a graph illustrating the relation between the flange height H and the maximum stress arising in the fastening member 301. In the graph in FIG. 9, the maximum stress when a coned disc spring was used instead of the elastic member 302 is indicated by a broken line.

As illustrated in FIG. 9, in the attachment structure 30 for attaching the brake disk 10 to the attachment object member 20, when the elastic member 302 having the flanges 3025 and 3026 was used, the maximum stress arising in the fastening member 301 became smaller in comparison to the case where the coned disc spring was used. In other words, it was found that the load applied to the fastening member 301 can be reduced by the elastic member 302.

By means of the present example, it was confirmed that if the flange height H is 5 mm or less, maximum stress arising in the fastening member 301 decreases more than when using a coned disc spring. Hence, it can be said that, in order to reliably reduce the load applied to the fastening member 301, it is preferable to set the flange height H to 5 mm or less. Note that, from the viewpoint of realizing a low spring constant, it is preferable that the flange height H is 1 mm or more.

REFERENCE SIGNS LIST 100, 200: Brake disk unit
10: Brake disk
20: Attachment object member
30, 40: Attachment structure
301: Fastening member
3011: Nut
3012: Bolt
3012a: Shaft portion
302, 402, 502, 602: Elastic member
3023, 4023: Outer peripheral surface
3023a, 3023b, 4023a, 5023a, 6023a: Curved portion
3024, 4024, 5024, 6024: Member body
3025, 3026, 4025, 5025, 5026, 6025: Flange

The invention claimed is:

1. A brake disk unit for a railway vehicle, comprising:
an annular brake disk;
an attachment object member, the attachment object member being a wheel of the railway vehicle or a disk body that is to be fixed to an axle of the railway vehicle; and
an attachment structure that attaches the annular brake disk to the attachment object member, the attachment structure comprising:
  a fastening member which fastens the brake disk to the attachment object member, the fastening member having a bolt including a shaft portion that passes through the brake disk and the attachment object member, and a nut that is to be attached to an end part of the shaft portion on the brake disk side; and
  an elastic member which is disposed between the nut and the brake disk; wherein the elastic member includes:
    a member body which has a tubular shape and into which the shaft portion is inserted,
    a first flange which is connected to an end part on the nut side among two end parts of the member body, a top surface of the first flange coming progressively closer to the nut as the first flange extends toward an outer peripheral side of the elastic member, the first flange protruding outward from the member body and contacting an outer peripheral portion of the nut, and
    an outer peripheral surface of the elastic member includes, in longitudinal sectional view of the elastic member, a first curved portion that connects the member body and the first flange.

2. The brake disk unit according to claim 1, wherein the elastic member further includes:
  a second flange which is connected to an end part on an opposite side to the first flange among the two end parts of the member body, coming progressively closer to a bottom surface of a large-diameter portion of a fastening hole of the brake disk as the second flange extends toward the outer peripheral side of the elastic member, the second flange protruding outward from the member body and contacting the brake disk.

3. The brake disk unit according to claim 2, wherein:
the outer peripheral surface of the elastic member includes, in longitudinal sectional view of the elastic member, a second curved portion that connects the member body and the second flange.

* * * * *